April 30, 1963 G. W. RIECKENBERG 3,087,345
MOTION-TRANSMITTING MECHANISM
Filed Feb. 29, 1960 2 Sheets-Sheet 1
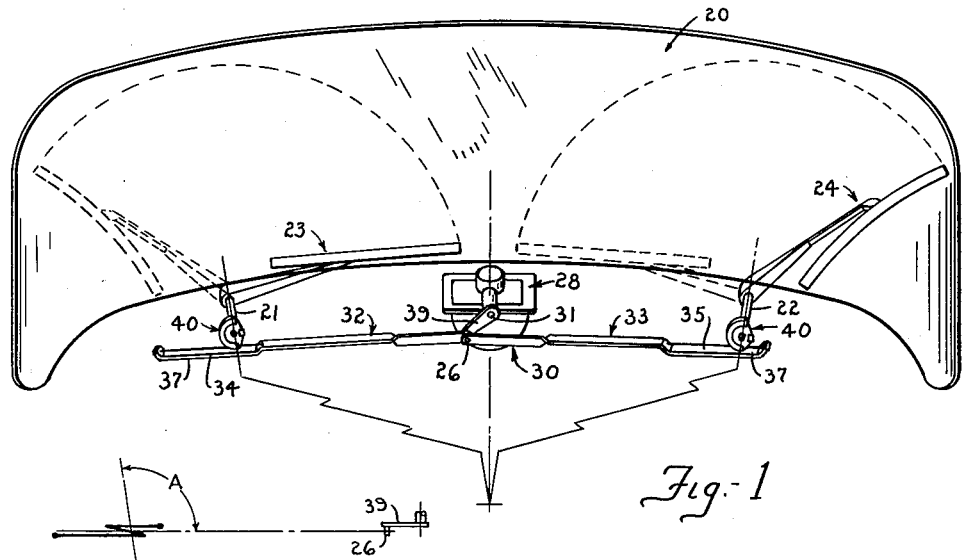
Fig.-1
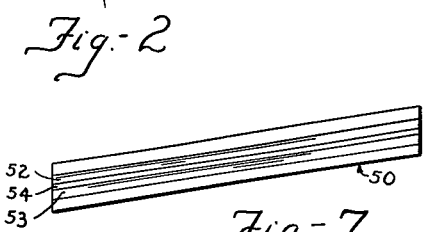
Fig.-2
Fig.-7
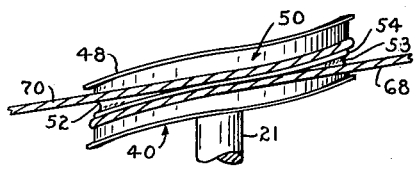
Fig.-3
Fig.-6
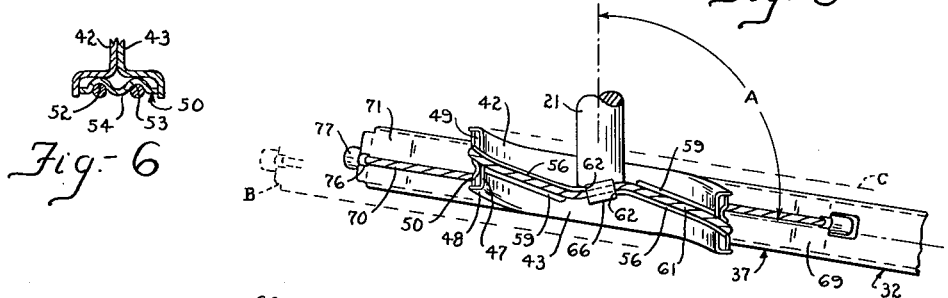
Fig.-4
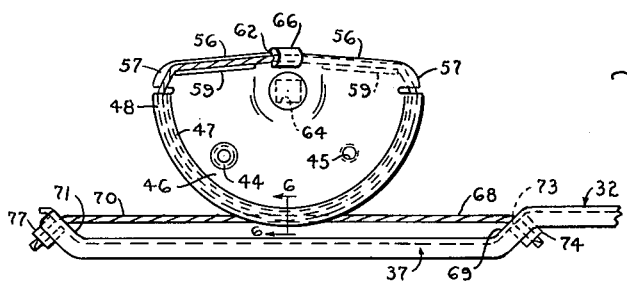
Fig.-5
INVENTOR.
GEORGE W. RIECKENBERG
BY W. E. Recktenwald
C. S. Penfold
ATTORNEY April 30, 1963  G. W. RIECKENBERG  3,087,345
MOTION-TRANSMITTING MECHANISM
Filed Feb. 29, 1960  2 Sheets-Sheet 2
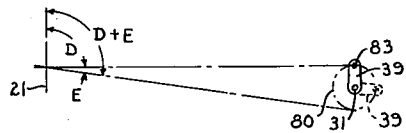
Fig.-8
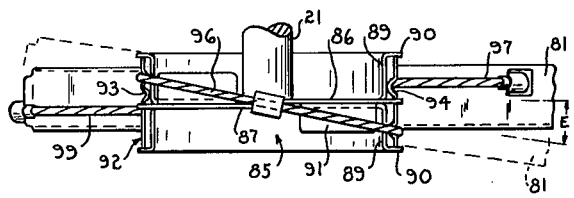
Fig.-9
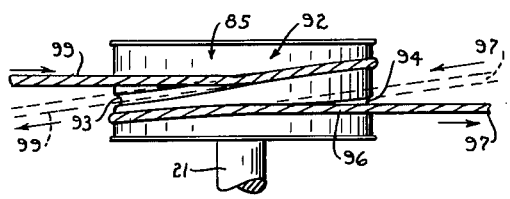
Fig.-10
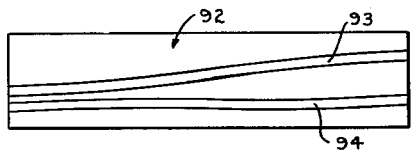
Fig.-11
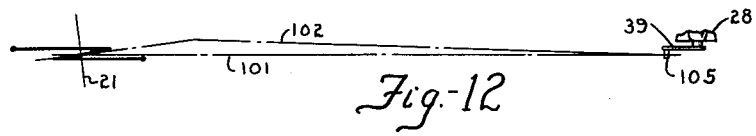
Fig.-12
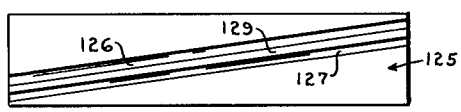
Fig.-17
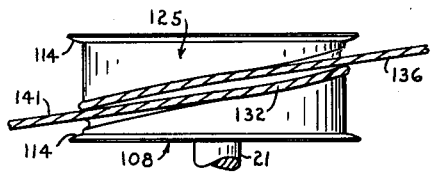
Fig.-16
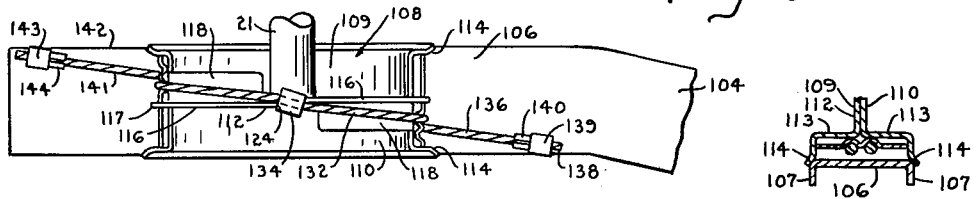
Fig.-13
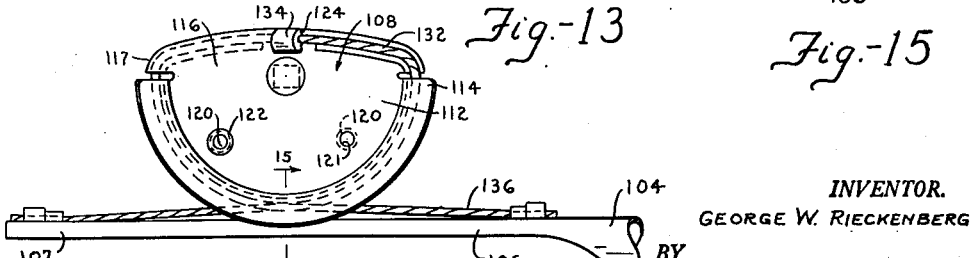
Fig.-15
Fig.-14
INVENTOR.
GEORGE W. RIECKENBERG
BY
W. E. Recktenwald
ATTORNEY

United States Patent Office 3,087,345
Patented Apr. 30, 1963

3,087,345
MOTION-TRANSMITTING MECHANISM
George W. Rieckenberg, Hobart, Ind., assignor to The Anderson Company, a corporation of Indiana
Filed Feb. 29, 1960, Ser. No. 11,595
17 Claims. (Cl. 74—95)

This invention relates to windshield wiper apparatus and more particularly is directed to improved means for converting reciprocatory movement to oscillatory movement.

This application is a continuation-in-part of my copending application Serial No. 5,381 filed January 29, 1960, now abandoned.

For many years two principal systems have been employed in the automotive industry for converting the motion created at the output end of a vacuum, air or electric motor to the oscillating motion of a pair of windshield wiper arm-and-blade subassemblies. One system is commonly called the "bar linkage" system which, stated broadly, employs rigid links and cranks between the output end of the motor and the pivot shift. The other system is commonly called the "cable drive" system which employs pulleys and cables to transmit the motion from the output end of the motor to the arm pivot shaft. Each prior system is repleat with disadvantages that have been substantially overcome with the device shown and described in the U.S. Patent No. 2,901,764 issued September 1, 1959 to John W. Anderson. The present invention is an improvement upon the basic structure set out in said just-enumerated patent.

Prior systems that use cables have experienced some difficulty after extended periods of operation in that the cables become frayed, abraded and/or broken. This problem is particularly noticeable on those makes of automotive vehicles where the angle between the axis of the pivot shaft and the plane passing through the output end of the power unit and the driven end of the pivot shaft is other than a right angle.

Since the direction of force from the wiper motor to the pivot shaft is at an angle other than ninety degrees, there is a force component at the operative connection between the wiper motor and the pivot shaft which acts in a direction substantially parallel to the axis of the pivot shaft whereby the resulting side thrust and the like causes wear and possible failure of the unit.

It is, therefore, a principal object of this invention to provide an improved motion-transmitting mechanism that overcomes substantially all of the above-noted disadvantages of the prior art.

It is a further object of this invention to provide an improved motion-transmitting mechanism wherein abrasion and chafing between operative parts are reduced to a minimum.

It is another object of this invention to provide an improved motion-transmitting mechanism wherein the direction of forces from the wiper motor to the pivot shaft is along a substantially straight line or in substantially a single plane.

A further object of this invention is to provide an improved motion-transmitting mechanism that has a driven structure for receiving applied forces along a substantially true tangent.

A still further object of this invention is to provide an improved motion-transmitting mechanism that is extremely silent and highly efficient in operation.

Another object of this invention is to provide an improved motion-transmitting mechanism that is relatively inexpensive to manufacture and maintain, has relatively few operating parts, and does not need frequent adjustments, service or replacement of parts.

And another object of this invention is to provide an improved motion-transmitting mechanism having less drag on the motor and less interference between operative parts of the system to thereby increase motor life and over-all efficiency.

These and other objects and advantages of the invention will become apparent after the description hereinafter set forth is considered in conjunction with the drawing annexed hereto.

FIGURE 1 is an elevational view of the rear side of a windshield illustrating the apparatus embodying the invention as applied thereto;

FIGURE 2 is a top schematic view of the relationship of certain operative parts of my invention;

FIGURE 3 is a bottom view of the pulley member and cable of FIGURE 5;

FIGURE 4 is a top view of the pulley member and link of FIGURE 5;

FIGURE 5 is a front view of the pulley member and link embodying my invention;

FIGURE 6 is a cross-sectional view taken on the line 6—6 of FIGURE 5;

FIGURE 7 is a plan view of the raceway of the pulley member;

FIGURE 8 is a schematic view similar to FIGURE 2 showing a modified form of my invention;

FIGURE 9 is a top view of the pulley member and link forming the parts of the modified form of my invention shown schematically in FIGURE 8;

FIGURE 10 is a bottom view of the pulley member and cable of FIGURE 9;

FIGURE 11 is a plan view of the raceway of the pulley member of FIGURES 9 and 10;

FIGURE 12 is a schematic view similar to FIGURES 2 and 8 showing a further modified form of my invention;

FIGURE 13 is a top view of a pulley member and link forming parts of the modified form of my invention shown schematically in FIGURE 12;

FIGURE 14 is a front view of the modified form of pulley member and link assembly;

FIGURE 15 is a partial cross-sectional view taken on the lines 15—15 of FIGURE 14;

FIGURE 16 is a bottom view of the pulley member and cable of FIGURE 14; and

FIGURE 17 is a plan view of the raceway of the pulley member of FIGURES 13–16.

Referring to the drawings wherein the same reference numeral refers to the same part throughout the several views, a windshield 20 is illustrated as having a pair of pivot shafts 21, 22 mounted along the lower edge portion thereof for supporting a pair of windshield wiper arm-and-blade subassemblies 23, 24, respectively, for oscillatory movement across the surface of the windshield. A power unit 28 is operatively connected to the respective shafts 21, 22 through a motion-transmitting unit 30 whereby the oscillatory or rotary motion of the output 31 of the power unit or wiper motor 28 is converted to the oscillatory motion of the wiper arm-and-blade subassemblies. The power unit 28 is illustrated as a vacuum motor although it is within the scope of this invention to make use of an electric motor, an air motor or any other suitable type motor without departing from the spirit of the invention.

The motion-transmitting unit 30 is comprised of a pair of elongate link members 32, 33 which are channel-shaped in cross section and have an outer or one end portion 34, 35, respectively, offset with respect to the body of the link into an elongate section 37. The elongate sections 37 in the end portions 34, 35 face generally upward with respect to the lower portion of the windshield for a purpose to be more clearly described hereinafter. The other or inner end portions 38 of the link members 32 and 33 are pivotally pinned together and are pinned to the link 39 by the pin 26.

A pulleylike member 40 which may be die-cast, stamped, or the like is keyed to the inner end portion of each shaft 21 and 22. The shafts 21 and 22 are mounted in sleeve bearings, not shown, extending through the cowl of the motor vehicle. The operative relationship between one pulley member 40 and the unit 30 will be discussed, it being understood that the same conditions prevail with respect to the other pulley member 40. Each pulleylike member 40 is shown as comprised of a pair of stamped semicircular halves 42, 43 held in abutting face-to-face relationship with each other by the interfitting peened over lugs 44 which pass through the apertures 45. Each half 42, 43 has a web portion 46 to the semicircular periphery of which is formed a transverse shoulder portion 47 having a radially disposed lip portion 48. The oppositely directed shoulder portions 47 and lip portions 48 combine to form a peripheral channel 49 in which is seated a rim or raceway member 50. A pair of spaced-apart parallel grooves 52, 53 are formed in the member 49 with a raised rib 54 therebetween. The raceway member 50 seats on the shoulder portions 47 of the halves 42, 43 with the side edges of the raceway member abutting the lip portions 48 for positioning said raceway member on the pulley.

Each half 42 and 43 has the web 46 on one side of the center line thereof slightly extended to form a wall 56 which also extends diametrically outwardly from the web to a point overhanging the peripheral channel 49 to form a guide 57 which divides the ends of the channel into two parts. On the other side of the center line of the web 46, a ledge 59 is formed at right angles to the web in the same axial direction as the shoulder 47. When the two halves 42, 43 are abutted face to face and the lugs 44 are peened over the respective guides 57, walls 56 and ledges 59 form a guiding crossover whereby the respective reaches of a cable 61 are changed over from one groove 52 to the other groove 53. An opening 62 is provided between the adjoining edges of the walls 56 of the halves 42, 43. A noncircular opening 64 is formed through the halves 42, 43 at the geometrical center of the semicircular peripheral shoulder 47 which is adapted to be positively engaged with a coacting surface on the ends of the pivot shafts 21, 22 for keying the pulleylike member 40 to said pivot shaft.

The halves 42, 43 when assembled have a prestamped shape such that the web 46 and the peripheral portions 47 and 48 are formed in a spiral shape best illustrated in FIGURES 3 and 4, such as to simulate a section of a thread on a threaded member. The spiral shape of the pulley has a predetermined axial lead or pitch, the amount of which can be varied during manufacture for a purpose to be described hereinafter.

A lug 66 is securely clamped near the mid-point of the cable member 61 which has one end 68 fastened to the sloping portion 69 of the inner end of the section 37 of the link 32 and has its other end 70 fastened to the sloping portion 71 at the outer end of the section 37. The cable 61 is wrapped around the pulley 40 with respective reaches thereof lying in the grooves 52, 53 in the peripheral channel 49 with the lug 66 seated in the opening 62 between the edges of the walls 56 to prevent slipping between the cable and the pulley. The end 70 of the cable passes through an opening 73 in the sloping portion 69 and has a lug 74 clamped thereto which is adapted to abut against the underside of said portion 69. A longitudinal slot 76 is formed in the sloping portion 71 through which is passed the end portion 70 of the cable. A lug 77 is clamped to said end 70 of the cable and is adapted to seat against the outer face of the sloping portion to secure said end of the cable in place on the link. Before the lug 77 is clamped in place the cable is loaded in tension a predetermined amount so as to reduce looseness and slop between the cable, pulley and link.

The offset of the portion 37 of the link 32 or 33 is sufficient to substantially suspend the pulley 40 from the link so that the only operative connection between the pulley and link is through the cable 61.

It is to be understood that the specific interconnection between the pulley and the link member as well as the attachment of the cable to the link member and to the pulley described above is for illustration purposes. The invention contemplates that the pulley and link member be operatively connected by wrapping the cable at least partially around the pulley and attaching the cable ends to the link member so that reciprocation of the link member oscillates the pulley.

The motor 28 is operatively connected with the motion-transmitting unit 30 in such a way as to reciprocably drive the unit 30 during the wiping operation and to move the unit 30 and arm-and-blade subassemblies into parked position when the motor is shut off. The crank 39 is keyed to the shaft 31 so as to be oscillatably driven by said vacuum motor. As the shaft 31 is oscillated, the crank 39 reciprocates the unit 30 and drives the pulleys 40, shafts 21, 22 and arm-and-blade subassemblies 23, 24 in an oscillatory manner. Since the pulleys 40 both operatively engage the links 32, 33 of unit 30 on the same relative side of the link, the arm-and-blade subassemblies are driven in a "tandem" wipe. A tandem wipe is understood to mean a condition wherein the arm-and-blade subassemblies 23 and 24 both move together in the same direction, i.e. both to the left and then both to the right.

Due to the limitations created by modern automotive body design and the like, it is virtually impossible to so position the output 31 of the wiper motor 28 relative to the pulley-like members 40 in such a way that the movement of the links 32, 33 will be at right angles to the axis of the pivot shafts 21, 22. That is, as best shown schematically in FIGURE 2 and in detail in FIGURE 4, the longitudinal axis of the link 32 crosses the axis of the shaft 21 at an angle designated "A," which angle varies between different makes and models of vehicles. The pulley member 40 has the web portion 46 and the channel-shaped peripheral portion 49 twisted or formed into a general helical shape having a predetermined axial lead. The angle "A" between the axis of the link 32 and the shaft 21 is substantially equal to the angle between the axis of the pivot shaft and a vertical plane containing a tangent to the spiral-shaped channeled periphery of the pulley; that is, the lead angle of the spiral of the pulley is substantially equal to the angle of intersection between the axis of the shaft and the axis of the link.

The schematic showing of FIGURE 2 illustrates the most ideal conditions for the maximum effect of the present invention. That is, using a vacuum motor 28 of the type illustrated the oscillatory motion of the output crank 39 defines a plane which intersects the axes of the pivot shafts 21, 22 at an angle generally within the range of between 45 degrees and 135 degrees. With the relationship between the output of the motor and the pivot shaft thus defined, a plane containing a line tangent to the spiral periphery of the pulleylike member at the point of tangency between the pulley, link and cable intersects the output pivot on the crank 39 whereby reciprocation of the crank by the motor moves the link substantially always in the same plane. In this way the longitudinal axis of the outer end portion 37 of the link intersects the pivot shaft axis at a substantially constant angle A, which angle is substantially equal to the lead angle of the spiral-shaped periphery of said pulleylike member. Since the grooves 52, 53 are spiral shaped and have a lead angle substantially equal to the angle between the axis of the link and the axis of the pivot shaft, the cable 61 attached to the link passes into and out of the grooves of the pulley member along a line tangent thereto, thereby substantially eliminating chafing and binding between the cable and the walls of the grooves in the pulley member. To provide for the axial displacement of the grooves 52, 53 relative to each other, it will be noted in FIGURE 4 that the ends 68 and 70 of the cable 61 are offset slightly sidewise with respect to the center line of the end portion 37 of the link 32 so as to permit the cable to enter and leave the grooves 52, 53 along substantially true tangent lines.

As described above, the channeled periphery 49 of the pulleylike member 40 is formed into a spiral shape having a predetermined axial lead. The extent of the axial lead of the spiral-shaped periphery of the pulley is determined by the size of the angle of intersection between the axis of the link 32 and the pivot axis 21 such that the cable 61 connected to the link and pulley intersects the pulley along a tangent line which is substantially in a plane containing the longitudinal axis of the link and the tangent to the center line defining the lead of the spiral-shaped pulley. Due to the spiral shape of the pulley having a lead angle equal to the angle between the link and the shaft, the reciprocatory motion of the link is applied to the pulley by the cable 61 substantially along the line lying tangent to the center line of the spiral of the pulley which transmits the motion to the shaft as oscillatory motion thereof. Since the link is, to all intents and purposes, not transmitting any force other than along its longitudinal axis and since the force on the pulley is received along a tangent line to the lead of the spiral periphery, practically no side thrust is created between the cable 61 and the walls of the grooves in the periphery of the pulley. The elimination of the side thrust between the pulley and the cable substantially reduces friction therebetween as well as wear between said cable and said pulley.

As the link 32 is reciprocated the shaped end portion 37 thereof moves from the dotted-line position B to the dotted-line position C as the pulley member 40 rolls from one extreme position to the other. The slight sidewise movement of the link is caused by the shape of the spiral which in one extreme position is spaced relative to the other extreme position along the axis of the shaft 21. The direction of the applied force from the link and cable to the pulley member is substantially tangential to the contacted part of the spiral-shaped periphery of the pulley whereby virtually no side thrust is transmitted from the cable to the pulley member.

The modified form of my invention shown in FIGURES 8–11, inclusive, is directed to the problem wherein the crank arm 39 on the output shaft 31 of a power unit 80 oscillates or rotates in a plane which is substantially parallel to the longitudinal axis of the pivot shaft 21. In the form illustrated in the schematic showing of FIGURE 8, the motor or power unit 80 is an electric motor such that the crank 39 rotates through a full 360 degrees in the process of reciprocating the link member 81 positioned between the pin 83 carried by the crank 39 and the operative connection with the pulley 85 carried by the pivot shaft 21. It is believed to be obvious that in the extreme positions of the pin 83 on the crank 39 the link 81 will swing through an arc defining an angle E of several degrees about the point of intersection of the link with the axis of the pivot shaft. As shown in FIGURE 9, the longitudinal axis of the link 81 will cross the axis of the pivot shaft at a changing angle varying from the angle "D" to the angle "D" plus "E," the angle through which the link 81 moves from one extreme position to the other. Under this set of circumstances, it is believed to be obvious that any cable, if set at a predetermined angle to the axis of the pivot shaft to form a tangent with a predetermined helix angle on the pulley, will be tangent at only one point during the oscillation of the pulley. The modification shown in FIGURES 8 to 11 is intended to overcome the problem created by this last-stated fact and to produce substantial tangency between the cable and pulley throughout the cycle of operation of the system. It has been found that, as between winding and unwinding the cable on the pulley, the critical direction of tangency between the cable and the grooves of the pulley is during the time that the cable is being unwound from the pulley such that the portion of the cable being unwound is the loaded or force-transmitting member.

The pulley 85 is comprised of two like, but opposite, semicircular halves 86, 87, each one of which has a web portion integrally formed with a transverse peripheral shoulder 89 having a continuous lip 90. A transverse wall 91 is formed from the straight edge of the web in the same axial direction as the shoulder 89 to provide a platform for supporting certain reaches of a cable. A raceway member 92, shown rectangular and flat in FIGURE 11, is provided with a pair of unsymmetrically shaped grooves 93, 94 which, when wrapped about and seated against the shoulders 89 of the pulley member 85, produce a pair of guiding grooves having constantly changing helix angles with respect to the plane of the web of the pulley. The shape of the grooves 93, 94 are determined and computed by the angle of approach of the link relative to the surface of the pulley between the opposite extreme positions of the driven end 83 of the link. The pulley is attached to the pivot shaft 21 for movement therewith and has the plane of the web portion 87 lying transverse to the axis of the pivot shaft 21.

FIGURE 10 is a bottom view of the pulley 85 with a cable 96 wrapped therearound for transmitting force from the reciprocating link 81 to the pulley 85. In FIGURE 10, the solid-line position of the cable 96 shows the link 81 being moved to the right so that the one end portion 97 of the cable is under tension and is exerting pulling force on the pulley to rotate the pulley from left to right. The end portion 97 of the cable 96 is unwinding from the groove 94 of the pulley along a line substantially tangent to said groove 94. The end portion 99 of the cable 96 is being wound into the groove 93 on the pulley in a somewhat unloaded condition and along a line that is not tangent to the groove 93 at the point of reception of the cable 96 into the groove. Since the end 99 of the cable is substantially unloaded, the amount and degree of abrasion between the cable and the wall of the groove 93 is substantially negligible. After the crank 39 passes through the ninety-degree position of its stroke, as shown in dotted lines in FIGURE 8, the link 81 will begin to move to the left and, therefore, the end of the cable 99 becomes the tension member and lies tangent to the groove 93. As the crank 39 continues to rotate, the direction of force and the position of the link relative to the crank and pulley causes the end 99 to move gradually to the dotted-line position on the left-hand side of FIGURE 9 so that at the 180-degree point or extreme lower position of crank 39 in FIGURE 8 the end 99, as shown in dotted lines, is substantially tangent to the groove 93 in the pulley. The end 97 will gradually move to the dotted-line position on the right of FIGURE 10 and will wind onto the pulley in a nontangential relationship with respect to the groove 94. Therefore, the cable unwinds from the pulley under load along a line substantially tangent to the groove in the pulley and winds onto the pulley in the unloaded condition along a line substantially nontangent to the groove.

Due to the changing angle of approach of the link member 81 to the pulley when the output of the power unit moves in a plane substantially parallel to the axis of the pivot shaft, a gradually changing condition of tangency results with respect to the grooves in the periphery of the pulley, and slightly compromised forms of grooves must be provided so as to produce the nearest approach to tangential conditions during the loaded portion of the stroke of the cable on the link relative to the grooves in the pulley. The above description has been directed to one link 81 and one pulley 85, it being understood that the disclosure is not intended to be limited to only one since the more commonly used systems include at least two such links and pulleys. The description of one is for illustration purposes only.

FIGURES 12–17 show a further modified form of my invention wherein the crank 39 is driven by the output of the wiper motor in a plane which is substantially angularly disposed with respect to the axis of the pivot shaft and the link member is shaped into odd configurations between its opposite end portions so as to maneuver around obstructions that lie in the direct line of force application from the power source to the pivot shaft. This condition is schematically illustrated in FIGURE 12 wherein the dotted line 101 designates the direct line of force of the reciprocating motion from the power source to the pulley on the pivot shaft while the line 102 shows the actual center line of the link member connecting said power source to said pulleylike member.

An elongate link member 104 has one end pivotally connected at 105 to the crank 39 and has its outer end portion 106 angularly disposed with respect to the major axis of said link. The substantially straight outer end portion 106 is channel-shaped in cross section in the form of an inverted U as best shown in FIGURE 14 whereby the depending edges 107 add rigidity to said portion. The pulleylike member 108 is elongate in an axial direction and is comprised of a pair of mating halves 109, 110. Each half 109, 110 has a web portion 112 integrally formed with a transverse shoulder portion 113 having a radially disposed flange 114. One side of the web portion 112 of each half 109, 110 has an extension 116 (FIGURE 14), which includes a tongue 117 radially extending beyond the channel-shaped peripheral portion of the pulley. A supporting surface 118 is formed from the other side of each half and extends transversely to the web in the same axial direction as the shoulder 113. The halves are assembled by inserting mating lugs 120 through apertures 121 and peening said lugs over at 122 to secure the mating halves together. An opening 124 is formed between the inner ends of the respective extensions 116.

A rim or raceway member 125, such as shown in flat condition in FIGURE 17, is formed with a pair of grooves 126, 127 angularly disposed with respect to the side edges of the member and separated by a raised portion 129 such that when the raceway member is wrapped around the peripheral surface of the pulley 108 the grooves 126, 127 describe helical grooves in the periphery of the pulley. The raceway member 125 is nested between the flanges 114 of the halves of the pulley and seats against the shoulders 113.

As is best shown in FIGURES 13 and 14, a cable member 132 is adapted to be wrapped around the periphery of the pulley and has a lug 134 fixed near the midpoint of the cable for disposition in the opening 124 between the extensions 116 of the pulley. The end portion 136 of the cable is attached to the inner part of the portion 106 of the link 104 near the one side edge 138 of the link by means of a lug 139 abutting against a U-clamp 140 secured to the portion 106 of the link 104. The other end portion 141 of the cable is attached near the opposite side edge 142 of the extreme end of the portion 106 of the link by means of the lug 143 and U-clamp 144 secured to the link 104 The ends 141, 136 of the cable are substantially aligned with each other along the axis 101 lying in the plane which intersects the output of the power source. This plane, which substantially coincides with the dotted line 101 of FIGURE 12, is independent of the axis along the center line 102 of the link member 104. The spiral-shaped grooves 126, 127 formed in the periphery of the pulley 108 have a helix angle, which angle is substantially equal to the angle between the axis of the pivot shaft 21 and the plane formed by the axis 101 joining the aligned ends 141, 136 of the cable 132 and the output of the power source such that as the link 104 is reciprocated the direction of force from the output of the power source is substantially in the plane containing the tangents to the grooves 126, 127 in the periphery of the pulley.

As the link 104 reciprocates, the line of force along the cable to the periphery of the pulley will be along the tangents to the grooves 126, 127 in the surface of said pulley. It is believed to be obvious that the line of force from the link to the pulley along the cable 132 is such as to substantially avoid side thrust or abrasion between the cable and the walls of the grooves. To provide further stability between the pulley and the link, the peripheral edges of the flanges 114 of the pulley are flared outwardly so as to engage with the edges of the channel-shaped outer end portion 106 of the link 104. In this way, as the link reciprocates the cable 132 oscillates the pulley and rolls the flared edges thereof along the edges of the end portion 106 of the link.

For illustration purposes, the above description of FIGURES 12–17 has been directed to one link and pulley arrangement, it being understood that more than one such arrangement is within the scope of this invention.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A motion-transmitting mechanism comprising in combination: a driven shaft having a pulley secured thereto, actuating means adapted to be connected to a power source, said actuating means being provided with shaped guide means adapted to be received by a peripheral portion of the pulley having a flared edge, said guide means having a longitudinal axis substantially transversely disposed with respect to the axis of the shaft during at least a portion of its movement, said pulley having a pair of parallel helically shaped grooves formed in the periphery thereof, the axial leads of said helically shaped grooves of the pulley are substantially equal to the angular disposition of an axis drawn from a power source to the pivot shaft, flexible means operatively engaging in the grooves in the pulley and having ends attached respectively to the actuating means along said axis from the power source to the pivot shaft in a manner whereby reciprocation of the actuating means causes the flexible means to oscillate the shaft and pulley, said guide means coacting with said pulley to provide interengaging relationship therebetween for stabilizing the relative movement between said guide means and said pulley.

2. A motion-transmitting mechanism comprising in combination: an output shaft having a pulley member, a substantially rigid member adapted to be operatively connected to a power source and reciprocably driven by said power source in a direction of varying angularity with respect to the axis of the driven shaft, the peripheral portion of said pulley member having a pair of nonparallel grooves formed therein, a portion of each groove having an axial lead different than the axial lead of a corresponding portion of the other groove, the lead of the particular portion of the groove being determined by the instantaneous projected angle of intersection between the direction of movement of the rigid member and the axis of the pivot shaft, flexible cable means engaging in wrapped relationship in said grooves of said pulley member, said cable means being operatively secured to and coactive with said rigid member in a manner such that the respective portion of said cable disengages from its respective groove generally along the instantaneous direction of movement of the rigid member, said cable being adapted to drive said pulley member as said rigid member is moved with relation to said pulley member by power from said source.

3. A motion-transmitting mechanism adapted to be interposed between and connecting a power source and a windshield wiper blade for transmitting motion from said power source to said blade, comprising: a substantially rigid member operatively connected with said power source, a pulley member, an output shaft connected to said pulley member, the peripheral portion of said pulley member having a pair of helical grooves formed therein, a portion of one of said grooves being disposed at a varying axial lead with respect to a portion of the other groove, and flexible cable means engaging in wrapped relationship in said grooves of said pulley member, the respective portion of said cable means disengaging from its respective groove along the axis from the power source to the periphery of the pulley, said cable means being operatively secured to and coactive with said rigid member and being adapted to drive said pulley as said rigid member is moved with relation to said pulley by power from said source.

4. A motion-transmitting mechanism comprising in combination: a substantially rigid member adapted to be operatively connected with a power source and reciprocally driven thereby, a pulley member, the peripheral portion of said pulley member having a pair of nonparallel grooves formed therein, the axes of the grooves being disposed substantially nonparallel to a plane normal to the axis of the pivot shaft, the axial lead of the particular portion of the groove being determined by the instantaneous angle of intersection between the axis of the rigid member and the pivot shaft, flexible cable means engaging in wrapped relationship in said grooves of said pulley member, the respective portion of said cable means disengaging from its respective groove along the axis of the rigid member, said cable means being operatively secured to and coactive with said rigid member and being adapted to drive said pulley as said rigid member is moved with relation to said pulley by power from said source, said rigid member adapted to be reciprocally driven by said power source in a direction generally transverse to the axis of the pulley member at varying angles thereto during its reciprocation.

5. In a motion-transmitting mechanism and in combination: a driven shaft, a pulley member connected with and adapted to actuate the driven shaft, a reciprocally driven substantially rigid link adapted to be connected with a power unit and having the longitudinal axis of one end portion disposed at an angle with respect to the longitudinal axis of the driven shaft, said pulley member having a spiral-shaped groove formed in the peripheral surface portion thereof with the lead angle of said spiral substantially equaling the angle between the link and the shaft, and flexible driving means disposed in said spiral-shaped groove and being connected with the pulley member and with the link in a manner whereby reciprocating movement imparted to the link by a power unit causes the flexible means to tangentially wrap into and unwrap from the grooves of the pulley member for oscillating the driven shaft.

6. In a windshield wiper assembly and in combination, a source of power for reciprocal activation of said assembly, a subassembly disposed exteriorly of a windshield, and means operatively connecting said subassembly with said power source, said means comprising a pivot shaft with the outer extremity of which shaft the subassembly is connected to be driven thereby, a pulley member operatively associated with the inner end of said pivot shaft and adapted to drive said shaft, flexible cable means wrapped in engaging relationship with a substantial peripheral portion of said pulley member to drive said pulley member, and a substantially inflexible elongate linkage member having a longitudinal axis obliquely disposed with respect to the longitudinal axis of the pivot shaft, said flexible cable means having ends operatively connected with said linkage member at locations relatively close to the pulley member, the peripheral surface of said pulley member having a spiral shape with a lead angle substantially equal to the angle between the linkage member and the shaft, and a portion of said linkage member remote from said pulley member being operatively connected with said source of power for reciprocal transmission of power from said source of power to said pivot shaft for oscillatory movement of said subassembly.

7. In a windshield wiper assembly and in combination: a driven shaft having a pulley secured thereto, said pulley having a spirally shaped peripheral groove of a predetermined axial lead, actuating means, a portion of the actuating means having a longitudinal axis obliquely disposed with respect to the axis of the shaft, the axial lead angle of the peripheral groove of the pulley being substantially equal to the angular disposition of said portion of the actuating means with respect to the shaft so that relative movement between the superimposed periphery of the pulley and the actuating means is substantially along a common axis, and flexible means substantially surrounding the pulley and having ends attached respectively to the actuating means in a manner whereby reciprocation of the actuating means causes the flexible means to oscillate the shaft and pulley.

8. A motion-transmitting mechanism adapted to transmit reciprocal movement of a power source to an output pivot shaft comprising: an output pivot shaft, a pulley member operatively associated with one end of said pivot and adapted to drive said shaft, flexible cable means wrapped in engaging relationship with a substantial peripheral portion of said pulley member to drive said pulley member, and a substantially inflexible elongate linkage member having a longitudinal axis disposed at an angle with respect to the longitudinal axis of the pivot shaft, said flexible cable means having ends operatively connected with said linkage member at locations relatively close to the pulley member, the peripheral surface of said pulley member having a helically disposed groove disposed at an angle substantially equal to the angle between the axis of the linkage member and the axis of the shaft throughout movement therebetween.

9. In a motion-transmitting mechanism and in combination: a driven shaft having a pulley secured thereto, said pulley having a pair of parallel, spirally shaped peripheral grooves of a predetermined axial lead, actuating means, said actuating means being provided with an elongate portion juxtaposed with respect to the periphery of the pulley, said elongate portion having a longitudinal axis obliquely disposed with respect to the axis of the shaft, the axial lead angle of the peripheral grooves of the pulley being substantially equal to the angular disposition of the elongate portion of the actuating means with respect to the driven shaft so that relative movement between the juxtaposed periphery of the pulley and the elongate portion of the actuating means is substantially along a common axis, and flexible means substantially surrounding the pulley in the peripheral grooves and having ends attached respectively to the elongate portion of the actuating means in a manner whereby reciprocation of the actuating means causes the flexible means to oscillate the shaft and pulley.

10. In a motion-transmitting assembly and in combination, a pivot shaft, a pulleylike member operatively associated with the inner end of said pivot shaft and adapted to drive said shaft, the surface of said pulleylike member helically disposed with respect to said pivot shaft, flexible cable means wrapped in engaging relationship with a substantial peripheral portion of said pulleylike member to drive said pulleylike member, means operatively associated with the periphery of said pulley for receiving said cable means in tangential relationship therewith, and a substantially inflexible elongate linkage member adapted to be connected with a power unit and having a longitudinal axis obliquely disposed with respect to the longitudinal axis of the pivot shaft and lying adjacent the helical surface, said flexible cable means having ends operatively connected with said linkage member at locations relatively close to the pulleylike member.

11. In a motion-transmitting assembly and in combination, a pivot shaft, a pulley member having a helically disposed portion with helical grooves therein operatively associated with the inner end of said pivot shaft and adapted to drive said shaft, an elongate link member adapted to be connected with a power unit and having a portion juxtaposed with respect to the pulley member, the longitudinal axis of said portion of the link member being obliquely disposed with respect to the longitudinal axis of the pivot shaft, flexible cable means wrapped in engaging relationship with the grooves of the helical portion of said pulley member and having ends connected with said juxtaposed portion of said pulley member, and means operatively associated with the periphery of said pulley member for receiving said cable means in a tangential relationship.

12. In a windshield wiper assembly and in combination: a subassembly, a driven shaft connected with said subassembly, a pulley connected with said driven shaft, the peripheral portions of the pulley being helically disposed respectively at varying distances from a plane normal to the axis of the driven shaft, actuating means disposed obliquely to said shaft and operatively connected with a power unit, and flexible means substantially surrounding the peripheral portions of the pulley and having aligned ends attached to the actuating means for supporting one extremity of the actuating means juxtaposed with the pulley in a manner whereby reciprocatory movement imparted to the actuating means by a power unit causes the flexible means to oscillate the pulley and shaft.

13. In a windshield wiper assembly and in combination, an output pivot shaft, a pulleylike member being connected to oscillate said output pivot shaft, peripheral portions of the pulley being helically disposed respectively at varying distances from a plane normal to the axis of the pivot shaft and obliquely disposed with respect to the axis of the pivot shaft, and a power source being connected with and adapted to activate said pulley like member, said last-mentioned connection comprising a substantially rigid reciprocating member disposed obliquely to said pivot shaft and having attached thereto for coaction therewith cable means operatively embracing said pulleylike member and adapted to oscillate same.

14. In a motion-transmitting mechanism and in combination: a driven shaft, a pulley member connected with and adapted to actuate the driven shaft, a reciprocally driven substantially rigid link disposed obliquely to said driven shaft and adapted to be connected with a power unit, substantial portions of the periphery of the pulley member being disposed in helical nonconformity with a plane normal to the axis of the driven shaft, and flexible driving means disposed about and connected with the pulley member and with the link in a manner whereby reciprocating movement imparted to the link by a power unit causes the flexible means to actuate the pulley member and oscillate the driven shaft, said obliquely disposed link and pulley lying adjacent each other.

15. In a motion-transmitting mechanism and in combination: a driven shaft, a pulley member connected with and adapted to actuate the driven shaft, a reciprocally driven substantially rigid link disposed obliquely to said driven shaft and adapted to be connected with a power unit, the peripheral portion of the pulley member being disposed substantially helically to a plane normal to the axis of the driven shaft, and flexible driving means connected with the pulley member and with the link in a manner whereby reciprocating movement imparted to the link by a power unit causes the flexible means to oscillate the pulley member and the driven shaft, said pulley and obliquely disposed link lying adjacent each other.

16. In a motion-transmitting mechanism and in combination: a driven shaft, a pulley member connected with and adapted to actuate the driven shaft, a reciprocally driven substantially rigid link adapted to be connected with the power unit and having the longitudinal axis of one end portion disposed at an oblique angle with respect to the longitudinal axis of the driven shaft, said pulley member having a tangent to a peripheral portion lying in a plane disposed at a helical angle with respect to the shaft substantially equal to the angle between the link and the shaft, and flexible driving means connected with the pulley member and with the link in a manner whereby reciprocating movement imparted to the link by a power unit causes the flexible means to oscillate the pulley member and the driven shaft.

17. A mechanism for transmitting motion from a driving shaft to a driven shaft whose axis is inclined at an angle to the axis of the driving shaft comprising: a pulley member adapted to be connected with an actuate the driven shaft, said pulley member having a spiral-shaped groove formed in the peripheral surface portion thereof with the lead angle of said spiral groove defining a line of movement, a substantially rigid linkage means adapted to be connected with the driving shaft and having the longitudinal axis of the end portion adjacent the driving shaft disposed at an oblique angle with respect to the longitudinal axis of said driving shaft and the end of said linkage means adjacent the driven shaft having its longitudinal axis disposed in substantially parallel relation to the line of movement defined by the lead angle of the spiral groove of the pulley, and flexible cable driving means disposed in said spiral-shaped groove and connected with the pulley member and with the adjacent end of the linkage means in a manner whereby reciprocating movement imparted to the linkage means by the driving shaft causes the flexible cable driving means to actuate the pulley member for oscillating the shaft.

References Cited in the file of this patent

UNITED STATES PATENTS

| 2,521,983 | Kyle | Sept. 12, 1950 |
| 2,640,682 | Votypka | June 2, 1953 |
| 2,901,764 | Anderson | Sept. 1, 1959 |
| 2,947,185 | Ziegler | Aug. 2, 1960 |

FOREIGN PATENTS

| 647,006 | France | July 23, 1928 |
| 678,333 | France | Dec. 23, 1929 |